United States Patent
Bremer

[11] 3,726,141
[45] Apr. 10, 1973

[54] FAST-RESPONSE TWO-PHASE THERMOMETER

[75] Inventor: Norman C. Bremer, Ithaca, N.Y.

[73] Assignee: Maury Wallace, Ithaca, N.Y., a part interest

[22] Filed: Apr. 2, 1971

[21] Appl. No.: 130,666

Related U.S. Application Data

[63] Continuation-in-part of Ser. No. 120,825, March 4, 1971.

[52] U.S. Cl. .................73/368.3, 73/340, 73/368.4, 73/371
[51] Int. Cl. .............................................G01k 5/32
[58] Field of Search....................73/368.3, 368.4, 73/371, 340

[56] References Cited

UNITED STATES PATENTS

| | | | |
|---|---|---|---|
| 3,631,721 | 1/1972 | Nollen et al. | 73/368.3 |
| 3,183,672 | 5/1965 | Morgan | 73/368.3 X |
| 3,459,043 | 8/1969 | Young | 73/362 R |
| 2,097,100 | 10/1937 | Linsell | 73/362 R UX |
| 1,719,851 | 7/1929 | Raney | 73/368.3 X |
| 3,038,097 | 6/1962 | Graffenreid | 73/371 X |
| 2,081,914 | 6/1937 | Dow | 73/362 R |

*Primary Examiner*—Louis R. Prince
*Assistant Examiner*—Frederick Shoon
*Attorney*—Stoll & Stoll

[57] ABSTRACT

A thermometer having a first low boiling point or thermally-expansive fluid within a probe and a second relatively incompressible fluid at the thermometer calibrations, the first fluid and the second fluid being in pressure communication with each other through an intermediate elastomeric or porous medium such as a diaphragm or a multiple capillary porcelain plug. Vapor pressure or thermal expansion of the first fluid in response to the temperature of the probe environment will move the second fluid proportionately through a calibrated capillary bore whereby the temperature-related pressure of the first fluid may be read in calibrations of temperature. In a preferred embodiment the first fluid is a gas or gas-liquid equilibrium and the second fluid is a substantially incompressible liquid.

27 Claims, 24 Drawing Figures

FAST-RESPONSE TWO-PHASE THERMOMETER

REFERENCE TO RELATED APPLICATION

This application is a continuation-in-part of co-pending Pat. application, Ser. No. 120,825, filed Mar. 4, 1971 and entitled Bifurcated Thermometer Probe.

BACKGROUND OF THE INVENTION

1. Field of the Invention

This invention relates to thermometers for domestic, clinical and industrial use, for example, to clinical thermometers used in hospitals and to industrial thermometers used in photographic processing laboratories.

2. Description of the Prior Art

Conventional thermometers are, of course, heat-sensitive and responsive. A capsule containing mercury or other suitable heat-sensitive material is connected to a capillary tube. Exposure of the capsule to heat causes the mercury to expand and to rise in the capillary tube. This procedure, however, is relatively time-consuming. For example, in clinical use a true reading of a patient's temperature will require exposure of the mercury thermometer to his body heat for a period of 3 or so minutes. In a busy hospital the time lag which this requires is economically wasteful, and hospital personnel cannot devote sufficient time to each patient for this purpose. In emergency situations where immediate information concerning the patient's temperature is imperative, the time lag which this method requires is procedurally excessive and unacceptable.

Independent searches have developed the following prior U.S. Pats.:

| Number | Name | Date |
|---|---|---|
| 2,208,149 | Vernet | July 16, 1940 |
| 2,321,846 | Obermaier | June 15, 1943 |
| 2,415,309 | Stone | Feb. 4, 1947 |
| 2,694,415 | Dillon | Nov. 16, 1954 |
| 2,753,714 | Perkins et al. | July 10, 1956 |
| 2,949,132 | Asakawa et al. | Aug. 16, 1960 |
| 3,153,933 | Freismuth et al. | Oct. 27, 1964 |
| 3,221,555 | Biber | Dec. 7, 1965 |
| 3,254,533 | Tongret | June 7, 1966 |
| 3,349,896 | Ensign et al. | Oct. 31, 1967 |
| 3,377,862 | Gheorghiu | Apr. 16, 1968 |

SUMMARY OF THE INVENTION

In the present invention thermal expansion and contraction of a liquid is utilized only indirectly to obtain a temperature reading. The present invention comprises a thermometer which operates on a two-phase or two-stage principle. Heat is applied to a low boiling point liquid for the purpose of converting it into a gas and producing a pressure the magnitude of which is proportional to the temperature to which said liquid is exposed. A second liquid is exposed to the pressurized gas through a flexible diaphragm which causes the second liquid to rise in a calibrated capillary tube an amount which is in proportion to the rise in pressure. It is this second liquid which provides a reading of the temperature to which the first liquid is exposed.

Among the low boiling point liquids which may be used for this purpose is freon-12. This liquid, which is conventionally used in refrigeration and air conditioning systems, is very quickly responsive to changes in temperature. Hence, a thermometer reading based on the principle of the present invention and utilizing the two-phase or two-stage thermometer herein described and claimed requires a matter of seconds, in contrast to the minutes which conventional mercury thermometers require. The second fluid may be mercury or colored water.

In lieu of a calibrated capillary tube for temperature reading purposes there may be provided a pressure gauge the calibrations of which are degrees of temperature. If a graduated glass capillary tube is used, the opposing force to restrain the column is in the form of a bubble of air or gas in the upper end of the capillary tube, the unit pressure of which will always be the same as the pressure of the gas in the sensing bulb.

DESCRIPTION OF PREFERRED EMBODIMENTS OF THE INVENTION

The invention contemplates the use of a first fluid which is characterized by a relatively large coefficient of thermal expansion which reaches temperature equilibrium with its surroundings within a relatively short time. Such a fluid may exist at room temperatures and at one atmosphere pressure either as a liquid such as in the case of alcohol or as a gas such as in the case of freon-12 ($CCl_2F_2$). Between these extremes, the first fluid may exist in a closed vessel as a liquid-gas equilibrium. An example of the latter would be ether or ethyl chloride.

By way of illustration of the pressure response of the first fluid to ambient temperatures, freon-12 has a boiling point at 14.7 psi (one atmosphere) of −21.7°F. When the boiling point of freon-12 reaches 105°F, the gas pressure in a closed vessel would be 126.6 psi. Other corresponding pressures of freon-12 relative to temperature are 50 psi at 53°F and 150 psi at 117°F. These latter figures are useful in calibrating a capillary tube or pressure gauge.

The second fluid used in thermometers of the present invention should have the characteristics of virtual incompressibility, high visibility and, relative to the first fluid, a low coefficient of thermal expansion. Examples of such a fluid include mercury and colored water.

Figures 2, 3:
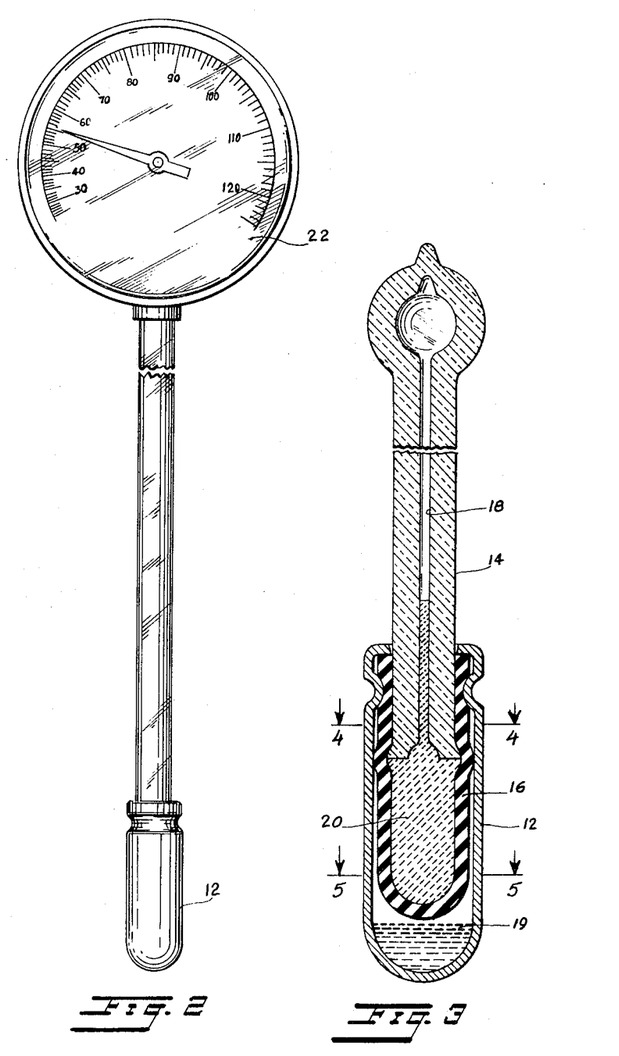
FIG. 2 is a front view of the thermometer of FIG. 1 but showing a pressure gauge in place of the calibrated capillary tube.
FIG. 3 is a longitudinal cross-sectional view through the thermometer as shown in FIG. 1, enlarged to show detail.
Figure 4:
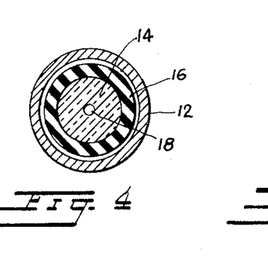
FIG. 4 is a cross-sectional view taken across line 4—4 of FIG. 3.
Figure 5:
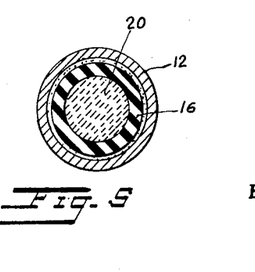
FIG. 5 is a cross-sectional view taken across line 5—5 of FIG. 3.
Figures 6, 7, 8, 9, 10:
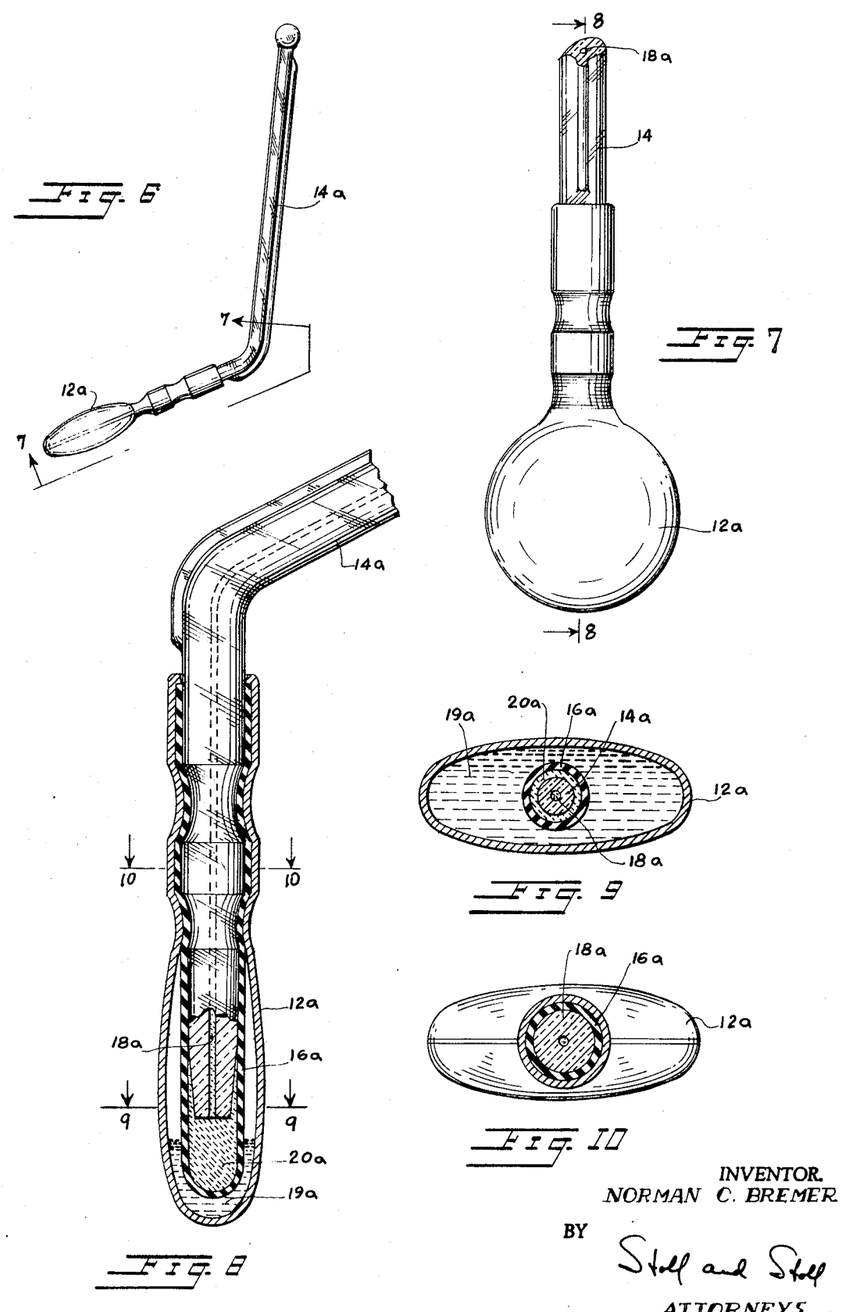
FIG. 6 is a front view of another form of the fast-response two-phase thermometer shown in FIG. 1 showing a bent capillary tube and having an enlarged bulb.
FIG. 7 is a bottom view of the thermometer of FIG. 6 showing the shape of the bulb. The direction of the view is taken across line 7—7 of FIG. 6.
FIG. 8 is a cross-sectional view taken across line 8—8 of FIG. 7.
FIG. 9 is a cross-sectional view taken across line 9—9 of FIG. 8.
FIG. 10 is a cross-sectional view taken across line 10—10 of FIG. 8.
Figures 11, 12:
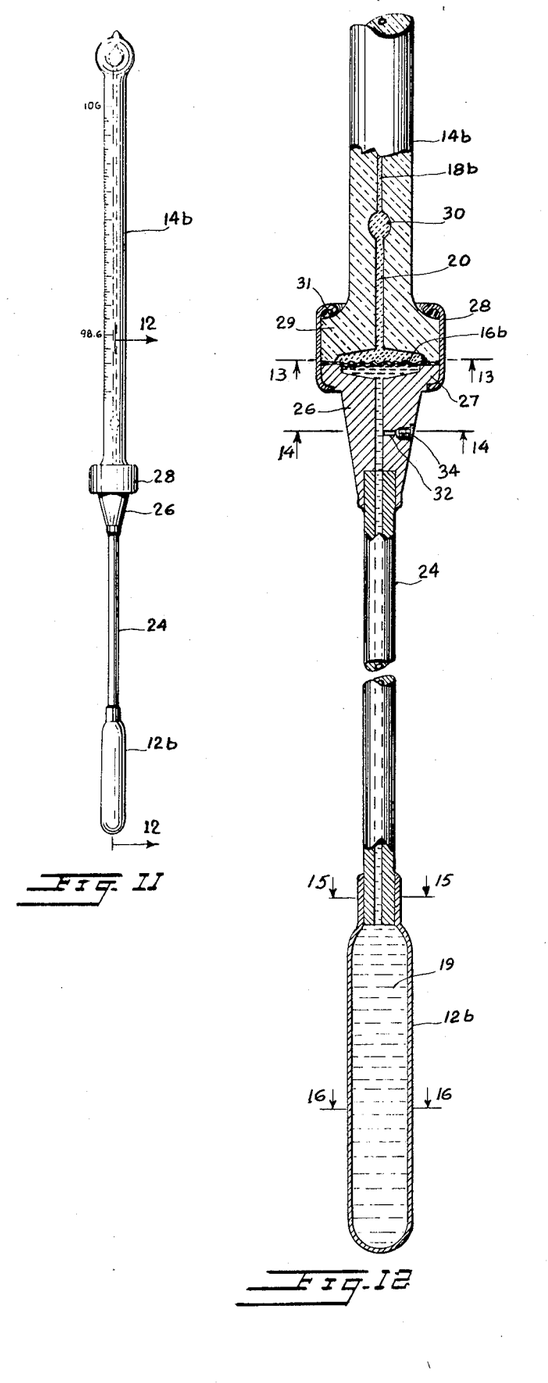
FIG. 11 is a front view of another modified thermometer in accordance with the present invention having an extended probe.
FIG. 12 is a longitudinal partial cross-sectional view taken across line 12—12 of FIG. 11 showing the internal construction thereof.
Figure 13:
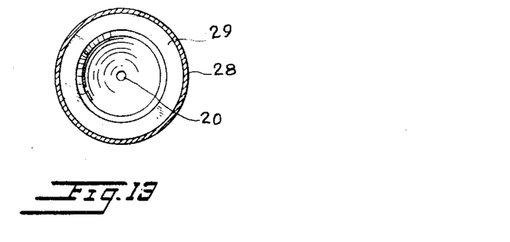
FIG. 13 is a cross-sectional view taken across line 13—13 of FIG. 12.
Figure 14:
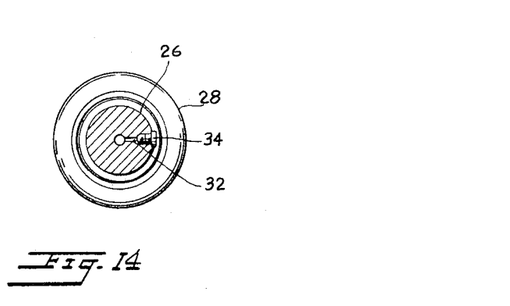
FIG. 14 is a cross-sectional view taken across line 14—14 of FIG. 12.
Figure 15:
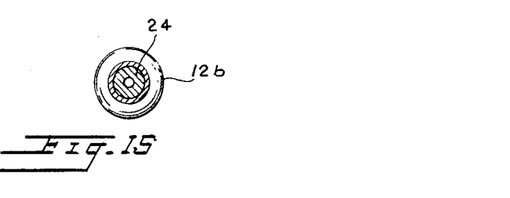
FIG. 15 is a cross-sectional view taken across line 15—15 of FIG. 12.
Figure 16:
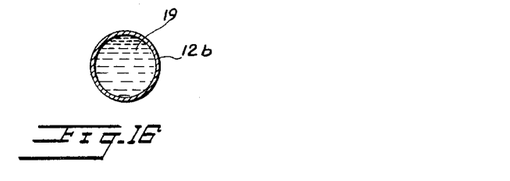
FIG. 16 is a cross-sectional view taken across line 16—16 of FIG. 12.
Figure 20:
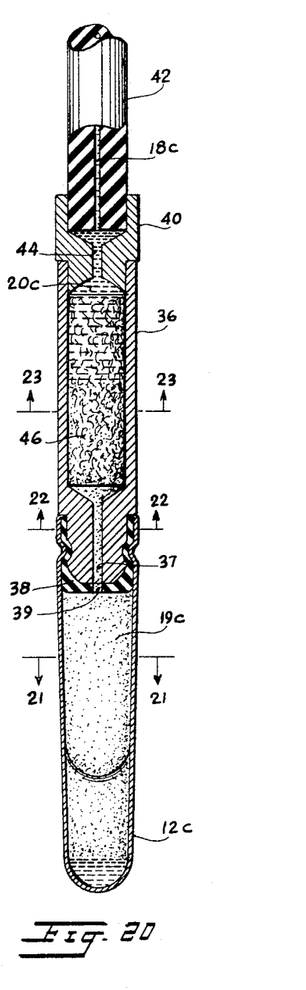
FIG. 20 is a cross-sectional view of the probe and a portion of the extended tube. The protective sleeve is not shown.
Figures 21, 22, 23, 24:
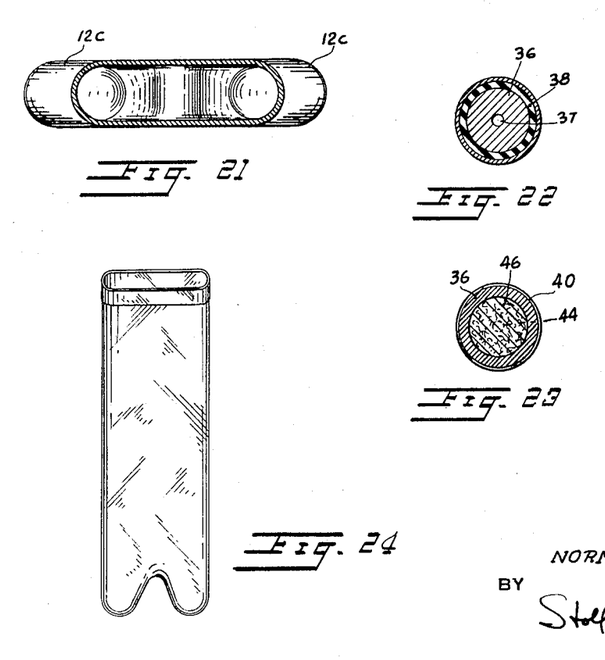
FIG. 21 is a cross-sectional view taken across line 21—21 of FIG. 20.
FIG. 22 is a cross-sectional view taken across line 22—22 of FIG. 20.
FIG. 23 is a cross-sectional view taken across line 23—23 of FIG. 20.
FIG. 24 is a perspective view of the protective sleeve shown in FIGS. 18 and 19.

Situated between or at the juncture of the two fluids is a fluid separating and pressure transmitting means which in all cases is intended to transmit pressure changes from the first fluid to the second fluid with minimum pressure loss while at the same time providing a thermal barrier between the two fluids. In instances in which the fluids should be physically separated, such as the case in which the second fluid is mercury which might otherwise amalgamate with the first fluid, the fluid separating means is a relatively impervious membrane which could be either an elastomeric bulb as shown in FIGS. 3 and 8 or an elastomeric diaphragm as is shown in FIGS. 12 and 13. In such cases in which it is not essential that the two fluids be completely separated, the fluid separating and pressure transmitting means may be a porous membrane, a porous plug as is shown in FIG. 20 or, if the range of temperature to be measured is small such as in a clinical thermometer, a single capillary bore. Although the two fluids come in contact with each other within the porous medium, mixing is kept to a minimum by the reduced area of contact within the porous medium and the surface tensions of the fluids. Pressure transmission from one fluid to the other is directly and readily accomplished in this case.

There are several factors which affect the response time of a thermometer reading. They include:

1. The rate of heat transfer from the substance under test to the sensing (first) fluid;
2. The specific heat of the sensing fluid; and
3. The heat absorbing properties of members in close proximity to the sensing bulb, namely, the stem which extends from the bulb.

The rate of heat transfer is itself dependent upon several factors including the material from which the bulb is made, the ratio of the surface area of the sensing bulb to the volume of fluid contained therein and the intimacy of the bulb to the substance under examination. Thus, for example, a metal bulb will transmit heat at a greater rate than a glass bulb. A spherical bulb having the least surface area to enclosed volume ratio will have a relatively poor rate of heat transfer to the sensing fluid. A sensing bulb placed tightly against the under side of the tongue will transfer heat from the tongue at a greater rate that will a sensing bulb which is held loosely in the mouth. It is a characteristic of the first fluid of the present invention that, in addition to having a relatively large coefficient of thermal expansion, it have a relatively low specific heat such that heat transfer to the fluid is rapidly converted into a substantial expansion of the fluid.

Other characteristics of the thermometer of the present invention include a small diameter, low heat loss stem extending from the bulb, a large bulb surface area in relation to the volume of sensing fluid contained, and means for maintaining the sensing bulb intimate proximity to the body tissues.

Use of a metal bulb or other metal components introduces the problem of possible amalgamation of the metal with mercury contained in the thermometer. It is another novel aspect of the present invention that the interior surfaces of all such metal components which may contact the mercury be coated to prevent direct contact between the mercury and the metal, thereby eliminating amalgamation. It is important, however, that such a coating, particularly when placed on the metal sensing bulb, not inhibit the rate of heat transfer. The coating should accordingly be thin yet strong so that it does not crack under mechanical and thermal stresses. It has been determined that a suitable coating is Formvar, a trademark of the General Electric Company for an enamel coating used generally to insulate motor and generator windings.

DESCRIPTION OF A FIRST EMBODIMENT

Referring now to the drawing, the fast-response two-phase thermometer 10 of the present invention comprises in a form shown in FIGS. 1 and 3–5 a bulb 12 and a calibrated stem 14. Bulb 12, which is preferably a metal enclosure, has an open top through which the lower portion of stem 14 extends. An elastomeric diaphragm 16 encloses the lower end of stem 14. Diaphragm 16 extends upwardly of stem 14 to adjacent the open top of bulb 12 which is crimped against stem 14 to provide a fluid-proof seal between the bulb and the diaphragm on the one hand and the diaphragm and the stem on the other hand. Diaphragm 16 constitutes in this form of the invention the fluid separating and pressure transmitting means.

Figure 1:
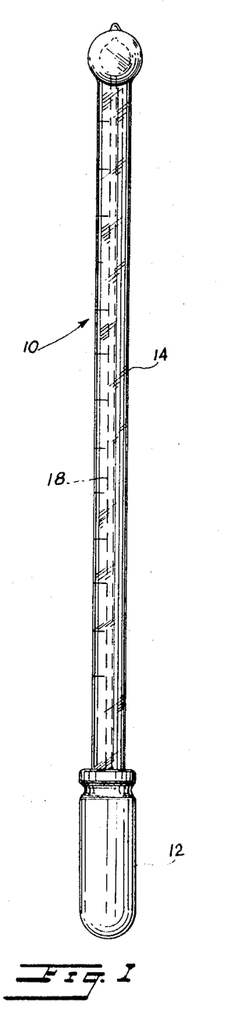
FIG. 1 is a front view of a first embodiment of a fast-response two-phase thermometer in accordance with the present invention showing a calibrated capillary tube.

Stem 14 may be constructed in a manner similar to conventional thermometers in that an evacuated capillary bore 18 is partially filled with a visible and virtually incompressible fluid such as liquid mercury, referred to as the second fluid 20. By virtue of the initial placement of second fluid 20 and by the resistance to flow within capillary bore 18, second fluid 20 tends to remain at the lower end of stem 14 whereat capillary bore 18 opens to diaphragm 16 forming a reservoir for the second fluid. Between bulb 12 and diaphragm 16 there is placed a first fluid 19 having a relatively larger coefficient of thermal expansion such as alcohol or carbon tetrachloride.

Operation of the invention is now quite apparent. Bulb 12, which is characterized among other things by having a high thermal conductivity, is placed in contact with a subject the temperature of which or whom is to be measured. First fluid 19 rapidly increases in heat until its temperature is in substantial conformity with the temperature of the subject. Accompanying the increase in temperature of first fluid 19 is a corresponding and proportional increase in its pressure. The pressure increase yields a volumetric expansion of first fluid 19 by way of deformation of diaphragm 16 whereby second fluid 20 is forced through capillary bore 18 to a position corresponding to the pressure exerted on it, which is in turn in correspondence with the temperature of the substance under test. Calibrations on tube 14 provide a reading in degrees of the temperature of the subject by virtue of the foremost position of second fluid 20 within the tube.

The two-phase feature of the invention is clear from the fact that two different fluids are used for two different purposes. The thermometer is fast-acting in large part because the coefficient of thermal expansion of the first fluid is quite large in comparison with, for example, the coefficient of thermal expansion of mercury when used alone in a conventional clinical thermometer. The large coefficient of thermal expansion permits use of less first fluid which reaches temperature equilibrium with its surroundings more quickly than a greater amount of fluid. The result is a fast temperature reading. As has been noted above, a large coefficient of thermal expansion may be achieved by the use of a gas rather than a liquid as the first fluid. Since the boiling point of freon-12 at one atmosphere is well below room temperature, freon-12 will be in its gaseous state when used in the present invention unless it is placed under initial pressure substantially in excess of one atmosphere.

Shown in FIG. 2 of the drawing is a slight modification of the first embodiment of the invention shown in FIGS. 1 and 3. In place of calibrated tube 14 there is utilized a pressure gauge 22, the dial calibrations of which are in degrees of temperature rather than in terms of pressure per unit area. The embodiments shown in FIGS. 1-5 are particularly useful in connection with temperature measurements for photographic or other chemical processing.

DESCRIPTION OF A SECOND EMBODIMENT

Referring now to the embodiment shown in FIGS. 6-10, it will be seen that calibrated tube 14a may be bent to provide a more convenient reading angle and that bulb 12a is an oblate spheroid for particular clinical use. In this embodiment of the invention, diaphragm 16a retains substantially all of the characteristics of the diaphragm of the embodiments shown in FIGS. 1-5.

DESCRIPTION OF A THIRD EMBODIMENT

Figure 17:
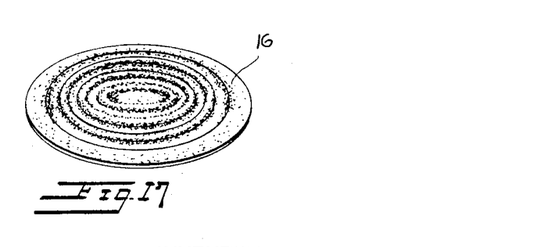
FIG. 17 is a fragmentary perspective view of the diaphragm of the thermometer of FIG. 11.

Shown in FIGS. 11-17 is an embodiment useful in connection with normal clinical use such as oral and rectal temperature measurements. Bulb 12a is connected by means of a metal tube 24 and a metal fitting 26 to a calibrated glass capillary tube 14b as follows: Fitting 26 and the open lower portion of tube 14b both have flanged mating surfaces 27 and 29 respectively for fitting in back-to-back relationship and a band 28 is clamped around the enlarged flanged portions. Between flanges 27 and 29 is secured a diaphragm 16b which in this embodiment is a relatively flat elastomeric material as shown in FIG. 17. Diaphragm 16b is the fluid separating and pressure transmitting means between first fluid 19 (located in bulb 12b, in tube 24 and in fitting 26 by means of communicating passageways) and second fluid 20 (in capillary tube 14b). Pressure exerted by thermal expansion of first fluid 19 is transmitted by means of diaphragm 16b to second fluid 20 for reading on the calibrated scale.

Diaphragm 16b also provides protection against chipping of glass flange 29. For further protection against such chipping an O-ring 31 may be provided between that flange and band 28.

In conformity with standard clinical thermometer practice, an enlarged portion 30 is provided in the capillary bulb 18b of tube 14b to retain maximum readings. In common with many standard clinical thermometers, the instrument is useful only in measuring a higher temperature than that at which the instrument initially reads and it is necessary to physically lower or reduce the level of the second fluid in tube 14b as by shaking, centrifugation, or the like to below the indicated temperature of the subject to be tested. Although this is an inconvenience in one sense, it is an advantage in another in that a reading once attained is retained for later use. When the thermometer is removed from the subject the reading thereon will not change unless the bulb is exposed to a higher ambient temperature.

Fitting 26 is provided with a side charging port 32 for ease in filling the instrument with first fluid 19. A sealing plug 34 is also used to close port 32.

DESCRIPTION OF A FOURTH EMBODIMENT

Figure 18:
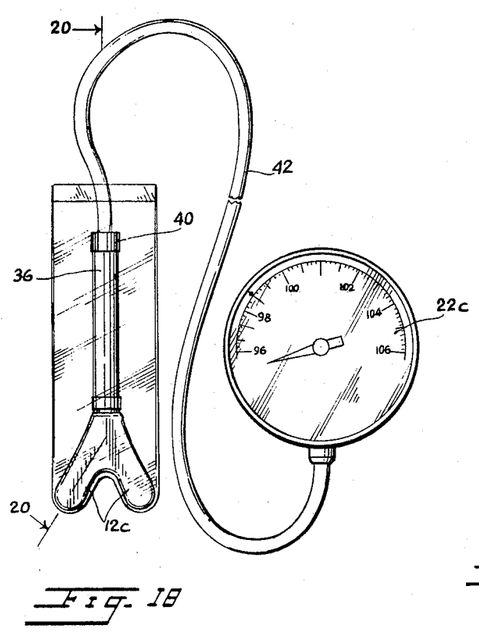
FIG. 18 is a front view of a remote reading thermometer constructed in accordance with the principles hereof having a bifurcated probe with a protective sleeve and a remote temperature-calibrated pressure gauge.
Figure 19:
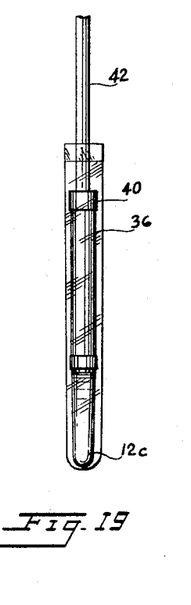
FIG. 19 is a side view of the bifurcated probe shown in FIG. 18 showing also a protective sleeve over the probe.

FIGS. 18-23 are illustrative of a fourth embodiment of the invention in which a bifurcated or two-branch probe is shown, particularly in FIGS. 18 and 20. The probe, which is the subject of my co-pending U.S. Pat. application entitled Bifurcated Thermometer Probe, Ser. No. 120,825 filed Mar. 4, 1971, comprises a bifurcated or two-pronged bulb 12c adapted to fit around the fraenum of the tongue. The two prongs of bulb 12c are in communication and together provide a single reservoir for first fluid 19c. The upper portion of bifurcated bulb 12c comprises a single opening adapted to receive an extension shell 36, preferably made of brass or like material. That upper portion, adjacent its opening, is crimped to one end of extension shell 36 with a sealing gasket 38 therebetween. In this embodiment of the invention, sealing gasket 38 is not to be confused with the fluid separating and pressure transmitting means such as diaphragm 16b of the third embodiment, see FIGS. 12 and 17. Gasket 38 is provided with a central hole 39 in alignment with a bore 37 in extension shell 36 for passage of first fluid 19c.

Shell bore 37 is provided with a larger diameter at the central and upper portions of extension shell 36 relative to a smaller diameter thereof at the lower end of extension shell 36. The larger diameter portion of bore 37 extends upwardly to open through the top of extension shell 36. Inserted into shell bore 37 at the open top of extension shell 36 is an adapter plug 40 which is provided with a receptacle for insertion of a capillary hose 42 extending to a pressure gauge 22c having calibrations in degrees of temperature. Capillary hose 42 is provided with a capillary bore 18c in communication with shell bore 37 through a connecting hole 44 in adapter plug 40. It will be seen that there is thus far direct communication between capillary bore 18c and the reservoir of bulb 12c.

Inserted into the enlarged portion of shell bore 37 is a porous medium 46 such as a wad of cotton, a ceramic or porcelain plug, a sintered material, a phenolic resin, or other similar material. Porous medium 46, which constitutes the fluid separating and pressure transmitting means in this fourth embodiment of the invention, completely fills the enlarged portion of shell bore 37 not occupied by adapter plug 40.

In common with the other embodiments of the invention, first fluid 19c is placed in bulb 12c and extends up to shell bore 37. Second fluids 20c is placed within capillary bore 18c and also extends into shell bore 37. The two fluids permeate porous medium 46 until they come into mutual contact with each other within the porous medium. Although there is slight mixing of the two fluids at the surface of contact, it is an attribute of porous medium 46 that there is no substantial mixing or interchange of the fluids. An expansion of first fluid 19c by virtue of a temperature rise results in direct pressure against and movement of second fluid 20c thereby providing a temperature reading on pressure gauge 22c.

The characteristic of porous medium 46 which prevents an undesirable amount of mixing of the first and second fluids is the presence of capillary passages in the medium. These small passages prevent the second fluid from "spilling" down into the bulb and maintain a junction surface between the fluids. Porous medium 46 may be a multiple capillary plug (the materials mentioned above are examples) or may have only a single capillary bore if the fluids will not mix undesirably. It has been determined that a single capillary bore is able to maintain alcohol and mercury in proper non-mixing contact while a multiple capillary medium is necessary when the first fluid includes a gas.

A single capillary bore may also be provided by a simple extension of capillary hose 42 directly into bulb 12c. The necessity for extension shell 36 and adapter plug 40 is therefore eliminated.

The length of porous medium 46 which corresponds to the longitudinal dimension of the enlarged diameter portion of shell bore 37 is somewhat greater than the total excursion of the junction surface from anticipated minimum pressure to anticipated maximum pressure. In particular, the volume of fluid which is contained in porous medium 46 should be greater than the volumetric change in the fluids anticipated as a result of temperature measurement.

In order to produce the fast temperature response which is characteristic of thermometers constructed in accordance with the present invention it is necessary, as has been noted, that the first fluid has a relatively large coefficient of thermal expansion and the second fluid has a relatively low coefficient of thermal expansion. But these characteristics alone do not provide the desired response. It is additionally necessary that both the bulb and the first fluid have a high rate of thermal conductivity. The first fluids mentioned are suitable. The bulb should be constructed with a thin but strong wall of a material such as stainless steel or a nickel-iron alloy having a relatively low coefficient of thermal expansion. Particularly suitable would be Invar, a trademark of Carpenter Steel Co. of Reading, Pennsylvania for a nickel alloy which provides these characteristics together with resistance to corrosion and ability to be sterilized. Fast temperature response is further dependent upon the absence or near absence of thermal expansion of the second fluid and of the tubes containing the fluid. Clearly, if the second fluid is mercury and if the thermal expansion of mercury is necessary to obtain a temperature reading then the response of the thermometer would be no faster than in conventional mercury-only thermometers. Accordingly, it is a characteristic of the present invention that the second fluid is thermally insulated from the first fluid and from ambient temperature. This is accomplished by virtue of thermal insulation provided between the fluids by the fluid separating and pressure transmitting means. In the cases of the diaphragms of the first three embodiments of the invention described, material utilized (rubber or other elastomeric material) should be a good thermal insulator but in addition, and perhaps equally as important, it will be noted that each of the diaphragms are circumferentially clamped or crimped between heat absorbing members. In the case of porous medium 46 of the fourth embodiment of the invention it should be noted that the material used should have a low heat transfering ability so that as a practical matter there is only a limited heat transfer across the junction surface of the two fluids. Materials which are particularly suitable include porcelain and phenolic resins.

A novel material having some elastomeric properties for use in the diaphragm is glass. As shown in FIG. 17, such a glass membrane would have sufficient convolutions to provide flexibility (three annular convolutions are shown) and would be quite thin (on the order of 0.003 of an inch thick). A glass diaphragm may be bonded rather than clamped to the adjacent members thereby providing in one bonding step a unitary device which is leakproof and does not require auxiliary bands or clamps. Glass diaphragms also have good thermal insulating properties.

It is also within the scope of the invention that thin metal diaphragms may be used, although they may have less than perfect heat loss properties. A suitable metal is Kovar, a trademark of the Westinghouse Electric Company for nickel-iron alloy. This material is suitable for bonding to adjacent glass members.

Rubber tubing where used should have a low coefficient of permeability to the fluid. Nitrile rubber is a suitable example.

It is to be understood that the term fluid as used herein includes liquids, gases, and combinations thereof.

While the foregoing is illustrative of preferred embodiments of the invention, it is clear that other em-

What is claimed is:

1. A thermometer, comprising:
   a. a thermally conductive sensing bulb;
   b. a first fluid, said first fluid being at least partially enclosed in said thermally conductive sensing bulb;
   c. a temperature-calibrated scale;
   d. a second fluid, said scale being readable in accordance with the position of said second fluid;
   e. fluid separating and pressure transmitting means, said means being situated between and in communication with said first and said second fluids, the position of said second fluid being determined by pressure exerted thereon by said first fluid acting through said means in consequence of thermal expansion or degree of vapor pressure of said first fluid, or contraction or degree of condensation of vapor of said first fluid;
   f. said fluid separating and pressure transmitting means comprising a membrane, said first fluid being in communication with another side of said membrane; and
   g. a capillary tube, said second fluid being at least partially enclosed within said capillary tube,
   h. said membrane being secured between said thermally conductive sensing bulb and said capillary tube at least partially in spaced relation to said thermally-conductive sensing bulb forming a first reservoir therebetween for said first fluid.

2. A thermometer in accordance with claim 1, wherein said membrane comprises a flexible bulb.

3. A thermometer in accordance with claim 1, wherein said membrane comprises a flexible diaphragm.

4. A thermometer in accordance with claim 1, wherein said membrane comprises a glass diaphragm.

5. A thermometer in accordance with claim 4, wherein said glass diaphragm is convoluted.

6. A thermometer in accordance with claim 4, wherein said glass diaphragm is annularly convoluted.

7. A thermometer in accordance with claim 4, wherein said glass diaphragm is bonded to the container for said first fluid and to the container for said second fluid.

8. A thermometer in accordance with claim 1, wherein said membrane comprises a metal diaphragm.

9. A thermometer, comprising:
   a. a thermally-conductive sensing bulb;
   b. a first fluid, said first fluid being at least partially enclosed in said thermally conductive sensing bulb;
   c. a temperature-calibrated scale;
   d. a second fluid, said scale being readable in accordance with the position of said second fluid; and
   e. fluid separating and pressure transmitting means, said means being situated between and in communication with said first and said second fluids, the position of said second fluid being determined by pressure exerted thereon by said first fluid acting through said means in consequence of thermal expansion or degree of vapor pressure of said first fluid, or contraction or degree of condensation of vapor of said first fluid;
   f. said fluid separating and pressure transmitting means comprising a porous medium, said first fluid permeating said medium from a first direction and said second fluid permeating said medium from a second and substantially opposite direction.

10. A thermometer in accordance with claim 9, wherein said porous medium comprises a ceramic plug incorporating a plurality of capillary holes.

11. A thermometer in accordance with claim 9, wherein said porous medium comprises a fiber plug.

12. A thermometer in accordance with claim 9, wherein said porous medium comprises a phenolic resin with a plurality of capillary holes.

13. A thermometer in accordance with claim 9, wherein said porous medium comprises a single capillary bore.

14. A thermometer in accordance with claim 9, additionally comprising:
   a. a capillary tube, said second fluid being at least partially enclosed within said capillary tube; and
   b. an extension shell, said extension shell being disposed between and in fluidic communication with said thermally-conductive sensing bulb on the one hand and said capillary tube on the other hand;
   c. said porous medium being contained within said extension shell.

15. A thermometer in accordance with claim 9, wherein:
   the length of said porous medium is at least as large as the linear excursion of said first fluid from minimum pressure to maximum pressure as determined by the anticipated range of temperature measurement.

16. A thermometer in accordance with claim 1, wherein said first fluid comprises liquid the boiling point of which is not higher than the temperature range to be measured.

17. A thermometer in accordance with claim 1, wherein said first fluid comprises freon-12.

18. A thermometer in accordance with claim 1, wherein said first fluid comprises an expansible fluid.

19. A thermometer in accordance with claim 18, wherein said first fluid comprises carbon tetrachloride.

20. A thermometer in accordance with claim 18, wherein said first fluid comprises alcohol.

21. A thermometer in accordance with claim 1, wherein said second fluid comprises mercury.

22. A thermometer in accordance with claim 1, wherein said temperature-calibrated scale comprises a calibrated capillary tube containing said second fluid.

23. A thermometer in accordance with claim 1, wherein said temperature-calibrated scale comprises a gauge actuated by said second fluid.

24. A thermometer in accordance with claim 1, wherein:
   said membrane is secured at least partially in spaced relation to said capillary tube forming a second reservoir therebetween in communication with the bore of said capillary tube for said second fluid.

25. A thermometer in accordance with claim 1, wherein said thermally conductive sensing bulb is provided with an internal coating.

26. A thermometer in accordance with claim 25, wherein said thermally conductive sensing bulb is metal and said coating is enamel.

27. A thermometer in accordance with claim 25, wherein said thermally conductive sensing bulb is a nickel alloy and said coating is enamel.

* * * * *